US010896260B2

(12) United States Patent
Nadgowda et al.

(10) Patent No.: US 10,896,260 B2
(45) Date of Patent: Jan. 19, 2021

(54) IMPLEMENTING PACKAGE VULNERABILITY ASSESSMENT FOR MICROCONTAINERS

(71) Applicant: INTERNATIONAL BUSINESS MACHINES CORPORATION, Armonk, NY (US)

(72) Inventors: Shripad Nadgowda, Maharastra (IN); Sastry Duri, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 16/162,315

(22) Filed: Oct. 16, 2018

(65) Prior Publication Data

US 2020/0117807 A1    Apr. 16, 2020

(51) Int. Cl.
*G06F 21/57*    (2013.01)
*G06F 8/65*    (2018.01)
*H04L 12/24*    (2006.01)

(52) U.S. Cl.
CPC ............. *G06F 21/577* (2013.01); *G06F 8/65* (2013.01); *H04L 41/082* (2013.01)

(58) Field of Classification Search
CPC .......... G06F 21/577; G06F 8/65; G06F 9/268; H04L 41/08

See application file for complete search history.

(56) References Cited

U.S. PATENT DOCUMENTS

| | | | |
|---|---|---|---|
| 8,752,183 B1 | 6/2014 | Heiderich et al. | |
| 9,998,323 B2 | 6/2018 | Chhatwal et al. | |
| 2010/0122245 A1* | 5/2010 | Igarashi | G05B 19/0426 717/170 |
| 2014/0096122 A1* | 4/2014 | Blumfield | G06F 8/65 717/170 |
| 2017/0019422 A1* | 1/2017 | Makowski | H04L 63/02 |
| 2017/0169229 A1* | 6/2017 | Brucker | G06F 21/577 |

(Continued)

OTHER PUBLICATIONS

Anonymous, "Red Hat Linux 9: Red Hat Linux Customization Guide", Red Hat, Inc. (2003); 302 pgs. (Part 1, 75 pgs.).

(Continued)

*Primary Examiner* — Ellen Tran
(74) *Attorney, Agent, or Firm* — Intelletek Law Group, PLLC; Gabriel Daniel Esq.

(57) ABSTRACT

A system for determining vulnerability of an application container is provided. The system receives a report associating a first version of a software package with a vulnerability and a second version of the software package as being an update that fixes the vulnerability. The system receives the first version and the second version of the software package. The second version has one or more files that correspond to files in the first version. The system identifies a changed file in the first version of the software package that is different from a corresponding file in the second version of the software package. The system identifies a container file in an application container that matches the changed file in the first version of the software package. The system associates the identified container file with the vulnerability.

17 Claims, 7 Drawing Sheets

(56) References Cited

U.S. PATENT DOCUMENTS

2018/0157550 A1 6/2018 Ivanov et al.

OTHER PUBLICATIONS

Anonymous, "Red Hat Linux 9: Red Hat Linux Customization Guide", Red Hat, Inc. (2003); 302 pgs. (Part 2, 75 pgs).
Anonymous, "Red Hat Linux 9: Red Hat Linux Customization Guide", Red Hat, Inc. (2003); 302 pgs. (Part 3, 75 pgs.).
Anonymous, "Red Hat Linux 9: Red Hat Linux Customization Guide", Red Hat, Inc. (2003); 302 pgs. (Part 4, 77 pgs.).
Gschwind, K. et al., "Optimizing Service Delivery with Minimal Runtimes"; International Conference on Service-Oriented Computing. Springer, Cham (2017); 4 pgs.
Lee, J. et al., "PKG-VUL: Security Vulnerability Evaluation and Patch Framework for Package-Based Systems"; ETEI Journal (2009); vol. 31:5, pp. 554-564.
Taha, A., "Intrusion Detection Correlation in Computer Network Using Multi-Agent System"; Ain Shams University (2011); 200 pgs. (Part 1, 66 pgs.).
Taha, A., "Intrusion Detection Correlation in Computer Network Using Multi-Agent System"; Ain Shams University (2011); 200 pgs. (Part 2, 66 pgs.).
Taha, A., "Intrusion Detection Correlation in Computer Network Using Multi-Agent System"; Ain Shams University (2011); 200 pgs. (Part 3, 68 pgs.).
Vachek, P., "Audit System at CESNET-CERTS", WSEAS Transactions on Computers (2009); vol. 8:9; pp. 1451-1460.
Zhou, W. et al.,"Always Up-to-Date: Scalable Offline Patching of VM Images in a Compute Cloud"; Proceedings of the 26th Annual Computer Security Applications Conference, ACM (2010); 10 pgs.

* cited by examiner

IMPLEMENTING PACKAGE VULNERABILITY ASSESSMENT FOR MICROCONTAINERS

BACKGROUND

Technical Field

The present disclosure generally relates to distribution of software elements.

Description of the Related Art

Software packages provide a convenient way of collecting and distributing a set of related files used to implement a specific software function. File sets in packages can broadly be classified as code, data and configs. Packages can be installed on a computer system by pre-compiled binary distribution or by manual installation via "make/install." Packages can also be installed on a computer directly or indirectly (as a part of dependency of other packages) via package managers such as apt, yum, npm. The package managers are typically included in an application container that includes run-time resources, management tools (such as the package manager), and operation system (OS) information.

A computer application is considered vulnerable when it can be exploited by criminals or hackers to steal information, launch cyber-attack, or cause other types of damages. A common source of vulnerability for a computer application are code files incorporated from software packages. A package is deemed vulnerable when at least one file in the package is vulnerable. Community maintained vulnerability databases such as Common Vulnerabilities Exposures (CVE) and National Vulnerability Database (NVD) publish vulnerability reports. These vulnerability reports are typically package-level reports that identify vulnerable packages without identifying vulnerable files.

SUMMARY

Some embodiments of the disclosure provide a system for determining vulnerability of an application container. The system receives a report associating a first version of a software package with a vulnerability and a second version of the software package as being an update that fixes the vulnerability. The system receives the first version and the second version of the software package. The second version has one or more files that correspond to files in the first version. The system identifies a changed file in the first version of the software package that is different than a corresponding file in the second version of the software package. The system identifies a file in an application container that matches the identified changed file in the first version of the software package. The system associates the identified file with the vulnerability.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

A microcontainer is an application container that includes only resources needed at run-time by the primary application of the container. To create a microcontainer for an application, static and dynamic analysis is performed to identify all run-time resources (e.g., binary files, libraries, configuration files, etc.,) used for the application to run. Based on the identified resources, a minimum run-time image including only those resources is created as the microcontainer. Resources not needed at application run-time, such as OS information or management tools (e.g., package managers) are not included in minimum run-time images. The minimum run-time image may be a statically compiled single binary file such as that of a go-language application.

When a computer system receives a vulnerability report from CVE or NVD that identifies a package as being vulnerable, an application container that includes a package manager can use the package manager to determine whether the application container is vulnerable. Specifically, the package manager can identify the source package of each file included in the container, and therefore determine whether the application is vulnerable based on whether any of the files is from a vulnerable package. However, a microcontainer does not have a package manager to help determine whether the microcontainer is vulnerable. Specifically, there is no package manager to help determine whether the container includes a file from a package that is cited by the vulnerability report.

Some embodiments of the disclosure provide a system for determining whether a microcontainer is vulnerable based on a package-level vulnerability report (e.g., a CVE or NVD report). The system receives the package-level vulnerability report identifying vulnerable packages and generates a file-level vulnerability report identifying vulnerable files. The file-level vulnerability report is generated by comparing (i) a first package that is identified by the package-level vulnerable report as being vulnerable with (ii) a second package that is identified by the package-level vulnerable report as fixing the vulnerability. The system then determines the vulnerability of the microcontainer by scanning the microcontainer to determine if any component file of the microcontainer matches a file identified by the file-level vulnerability report as being vulnerable.

Figure 1:
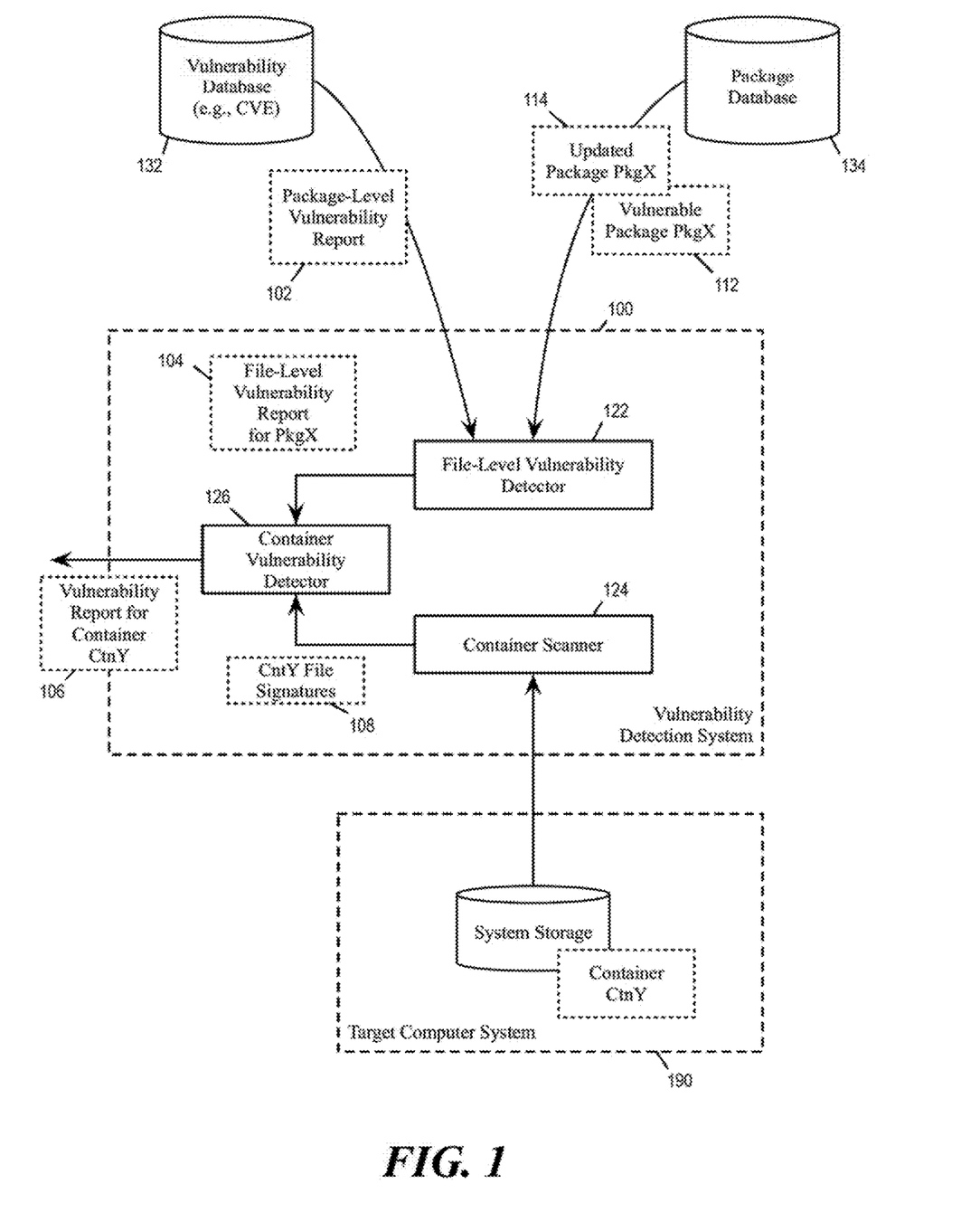
FIG. 1 illustrates a vulnerability detection system for determining whether a microcontainer is vulnerable based on a package-level vulnerability report, consistent with an exemplary embodiment.

FIG. 1 illustrates a vulnerability detection system 100 for determining whether a microcontainer is vulnerable based on a package-level vulnerability report 102, consistent with an exemplary embodiment. The vulnerability report identifies a first version 112 of a package "PkgX" as being vulnerable. The vulnerability report also identifies a second version 114 of the package "PkgX" as being an update that fixes the vulnerability. The system 100 compares the first version 112 and the second version 114 to generate a file-level vulnerability report 104 for the package "PkgX". The vulnerability detection system 100 uses the file-level vulnerability report 104 to generate a container vulnerability report 106 for a container "CtnY" running on a target computer system 190.

The vulnerability detection system 100 may be implemented on one computing device or multiple computing devices across a network. The vulnerability detection system 100 may also be implemented as a program running on the target computer system 190. As illustrated, the system 100 includes a file-level vulnerability detector 122, a container scanner 124, and a container vulnerability detector 126. In some embodiments, the file-level vulnerability detector 122, the container scanner 124, and the container vulnerability detector 126 are modules of software instructions being executed by one or more processing units (e.g., a processor) of a computing device. In some embodiments, the file-level vulnerability detector 122, the container scanner 124, and the container vulnerability detector 126 are modules of hardware circuits implemented by one or more integrated circuits (ICs) of an electronic apparatus. Though the modules 122, 124, and 126 are illustrated as being separate modules, they can be combined into a single module. An example computing device 700 that may implement the vulnerability detection system 100 will be described by reference to FIG. 7 below.

The file-level vulnerability detector 122 receives a package-level vulnerability report 102 from a vulnerability database 132 (e.g., CVE, NVD). Based on the content of the package-level vulnerability report 102, the file-level vulnerability detector 122 identifies the first version 112 of the package "PkgX" as being vulnerable and the second version 114 of the package "PkgX" as being an update that fixes the vulnerability. The file-level vulnerability detector 122 then retrieves the first and second versions of the package (112 and 114) from a package database 134, which is a repository for different versions of the package "PkgX". In some embodiments, the file-level vulnerability detector 122 obtains the first and second versions of the package by periodically crawling the package database 134.

The file-level vulnerability detector 122 compares the first version 112 and the second version 114 to generate a file-level vulnerability report 104 for the package "PkgX". An example package-level vulnerability report will be described by reference to FIG. 2 below. An example file-level vulnerability report will be described by reference to FIG. 5. The generation of the file-level vulnerability report will be described by reference to FIG. 3 and FIG. 4 below.

The container scanner 124 scans the application container "CtnY" running at the target computer system 190. For some embodiments in which the vulnerability detection system 100 is a program running on the target computing system 190, the vulnerability detection system 100 may directly access a system storage of the target computing system 190 to examine the content of the container "CtnY". For some embodiments in which the vulnerability detection system 100 is running on a computing device separate from the target computing system 190, the vulnerability detection system 100 may communicate with the target computing system 190 through a network of wired or wireless connections.

During the scan, the individual files or components of the container "CtnY" are recognized, and the container scanner generates file signatures (or keys) 108 for the recognized files or components. The container vulnerability detector 126 compares the generated signatures 108 of "CtnY" with the content of the file-level vulnerability report 104 to determine whether the container "CtnY" includes vulnerable components or files. The container vulnerability detector 126 then generates the container vulnerability report 106 for the container "CtnY" based on whether any vulnerable component is found. The generation of the container vulnerability report 106 will be described by reference to FIG. 5 below.

Figure 2:
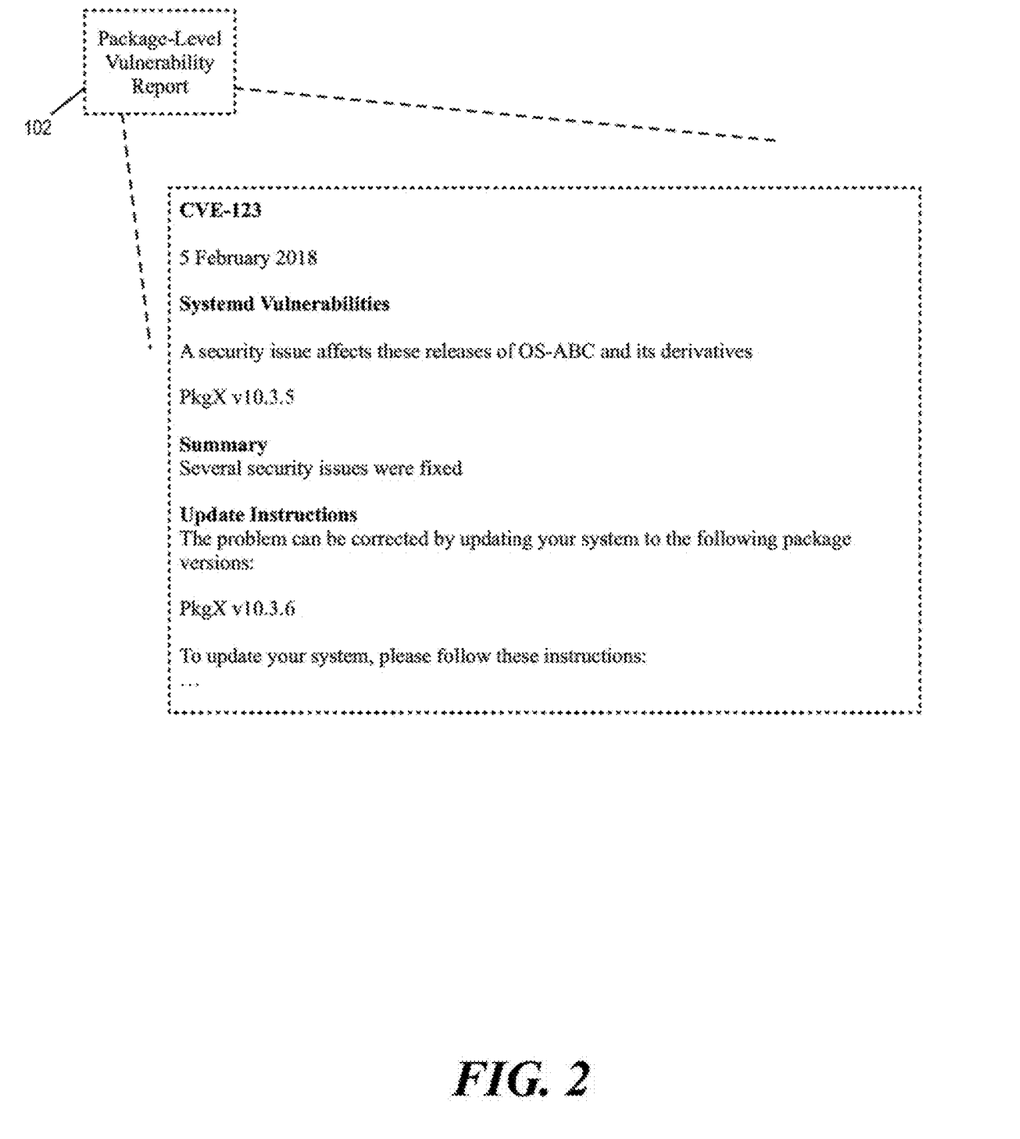
FIG. 2 illustrates example content of a package-level vulnerability report.

FIG. 2 illustrates example content of a package-level vulnerability report. As illustrated, the package-level vulnerability report 102 is uniquely identified by the identifier "CVE-123". The report 102 identifies a particular version of the package "PkgX" as being vulnerable (v.10.3.5). The report 102 also indicates an updated version (v.10.3.6) of the package "PkgX" that if installed, would remedy the vulnerability of the package. The report 102 does not identify which file or files in the vulnerable version of the package is/are vulnerable. Based on the content of the package-level vulnerability report 102, the file-level vulnerability detector 122 retrieves version v10.3.5 (the vulnerable first version 112) and version v10.3.6 (the fixed second version 114) of the package "PkgX." The file-level vulnerability detector 122 in turn generates the file-level vulnerability report 104 by comparing the version v10.3.5 with the version v10.3.6 of the package "PkgX."

Figure 3:
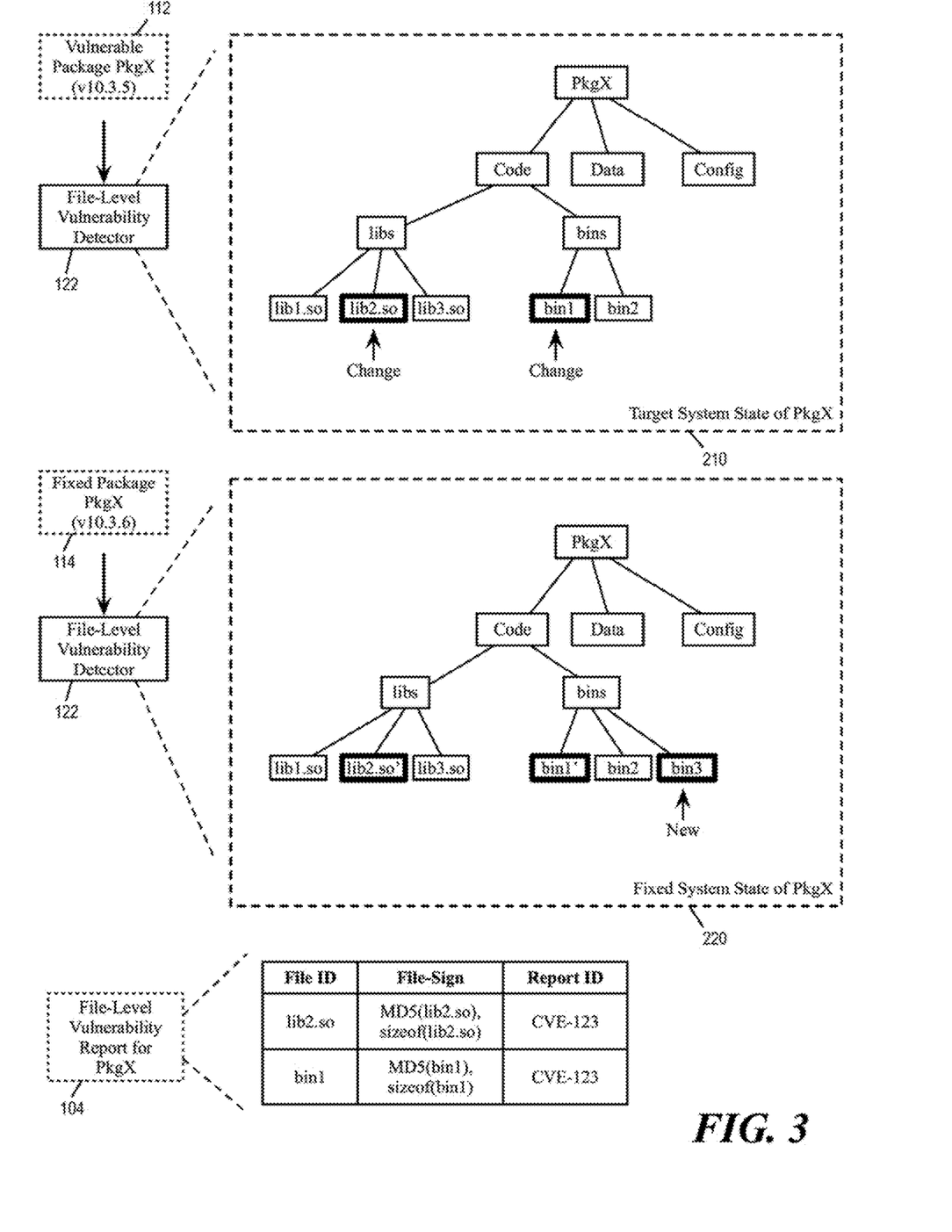
FIG. 3 illustrates generating the file-level vulnerability report by comparing a target system state based on a vulnerable first version of the package with a fixed system state based on the fixed second version of the package.

FIG. 3 illustrates generating the file-level vulnerability report by comparing a target system state based on the vulnerable first version of the package with a fixed system state based on the fixed second version of the package. As illustrated, the file-level vulnerability detector 122 extracts the files of the vulnerable first version v10.3.5 to construct a target system state 210 of the package "PkgX". In the target system state 210, the files of the version v10.3.5 of the package are at their designated paths and directories. The file-level vulnerability detector 122 also extracts the files of the fixed second version v10.3.6 to construct a fixed system state 220 of the package "PkgX". In the fixed system state 220, the files of the version v10.3.6 of the package are at their designated paths and directories.

The file-level vulnerability detector 122 compares the target system state 210 with the fixed system state 220 to identify any changed components or files. In the illustrated example, the file-level vulnerability detector 122 is able to determine that the files "lib2.so" and "bin1" in the fixed system state 220 are different than their counter parts in the target system state 210. (The files "lib2.so" and "bin1" in the fixed system state 220 are labeled with prime symbols to indicate that they are different from the target system state 210).

Based on the identified changes, the file-level vulnerability detector 122 is able to determine that files "lib2.so" and "bin1" are sources of vulnerability, since these are the files that the fixed second version 114 (v10.3.6) have changed in order to fix the vulnerability of the vulnerable first version 112 (v10.3.5). In addition to the changed files, the file-level vulnerability detector 122 is also able to determine that the fixed second version 114 (v10.3.6) has added a new file "bin3", which is not present in the vulnerable first version 112 (v10.3.5). In some embodiments, the file-level vulnerability detector 122 compares only code files (e.g., bin files and lib files) of the package but not data files or configuration files.

Based on the identified changed files, the file-level vulnerability detector 122 generates the file-level vulnerability report 104 for the package "PkgX", which includes a change set that lists the files that were changed from the vulnerable first version 112 (v10.3.5) to the fixed second version 114 (v10.3.6). In the file-level vulnerability report 104, each changed file is identified by its file name, its file signature, and its vulnerability report ID. The signature of a file may include the MD5 hash value of the file as well as the size of the file in the vulnerable package. The vulnerability report ID ("CVE-123" in the example) identifies the package-level vulnerability report 102 (v10.3.5 of "PkgX" in this example) from which the file-level vulnerability report 104 is derived.

Rather than creating a target system state and a fixed system state, the vulnerability detection system 100 may generate and compare file signatures of all files of the vulnerable first version and of the fixed second version. In some embodiments, the vulnerability detection system generates and compares file signatures for a selected subset of the files that are likely to have vulnerabilities rather than all files. In some of these embodiments, the vulnerability detection system generates and compares file signatures for code files (such as bin files and lib files) but not data files and configuration files.

Figure 4:
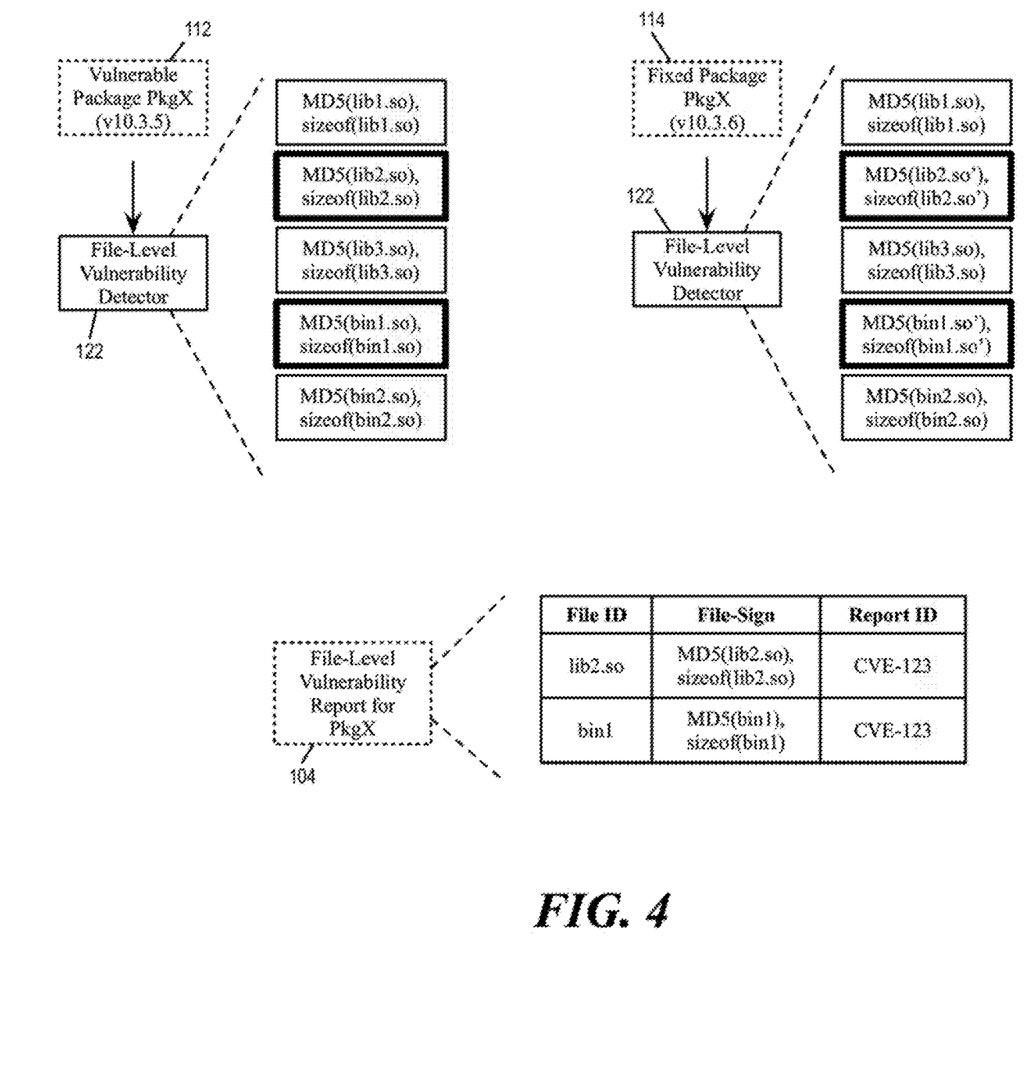
FIG. 4 illustrates generating the file-level vulnerability report by comparing file signatures of a vulnerable first version of a package with file signatures of a fixed second version of the package.

FIG. 4 illustrates generating the file-level vulnerability report 104 by comparing file signatures of the vulnerable first version 112 of the package "PkgX" with file signatures of the fixed second version 114 of the package "PkgX". As illustrated, the file-level vulnerability detector 122 generates signatures for code files (bin files and lib files) of the vulnerable first version 112 (version v10.3.5) and of the fixed second version 114 (version v10.3.6). The file-level vulnerability detector 122 generates the file-level vulnerability report 104 by identifying code files that have different signatures in the vulnerable first version 112 than in the fixed second version 114. In the example of FIG. 3, the signatures of the code files "lib2.so" and "bin1" are different in the vulnerable first version 112 and in the fixed second version 114. The generated file-level vulnerability report 104 for "PkgX" therefore includes a change set that lists these two code files and their signatures (the signatures of the files in the vulnerable package).

Figure 5:
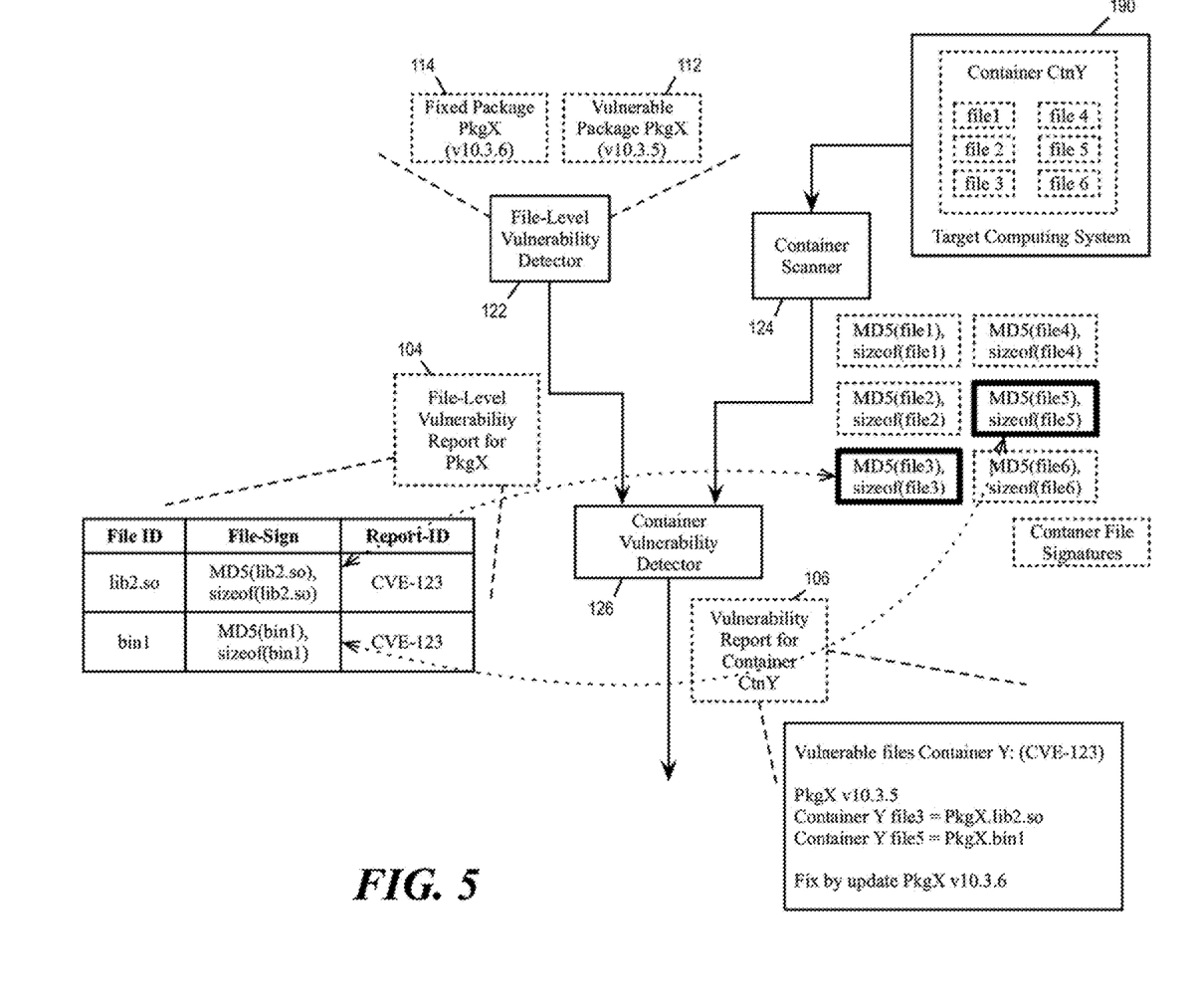
FIG. 5 illustrates the vulnerability detection system using the file-level vulnerability report to determine whether a container includes files that may be sources of vulnerabilities.

FIG. 5 illustrates the vulnerability detection system 100 using the file-level vulnerability report to determine whether a container includes files that may be sources of vulnerabilities. As illustrated, the file-level vulnerability detector 122 has generated the file-level vulnerability report 104 for the package "PkgX". The report identifies "lib2.so" and "bin1" as being the files that have changed from the first vulnerable version 112 (v10.3.5) to the second fixed version 114 (v10.3.6). The file-level vulnerability report 104 is in turn used to determine the vulnerability of the container "CtnY" in the target computing system 190.

The container "CtnY" is a microcontainer that does not include a package manager. To determine whether any of the files of the container "CtnY" is a source of vulnerability, the container vulnerability detector 126 examines the container "CtnY" for files that are cited as being vulnerable according to the file-level vulnerability report 104. Specifically, the container scanner 124 scans the files of the container "CtnY" and determines a signature for each file by determining the file's size and MD5 hash value. The container vulnerability detector 126 compares the file signatures of the container "CtnY" with the file signatures of the file-level vulnerability report 104 for matching signatures. As illustrated, the container "CtnY" includes files "file1", "file2", "file3", "file4", "file5", and "file6". Among these, in this example, the file signature of "file3" matches the file signature of "lib2.so" and the file signature of "file5" matches the file signature of "bin1". The files "lib2.so" and "bin1" are identified by the file-level vulnerability report 104 as being the changed file based on package-level vulnerability report 102 ("CVE-123"). Based on this information, the container vulnerability detector 126 produces a container vulnerability report 106 reporting that the container "CtnY" includes vulnerable files from the package "PkgX" version v10.3.5 that are later fixed.

Figure 6:
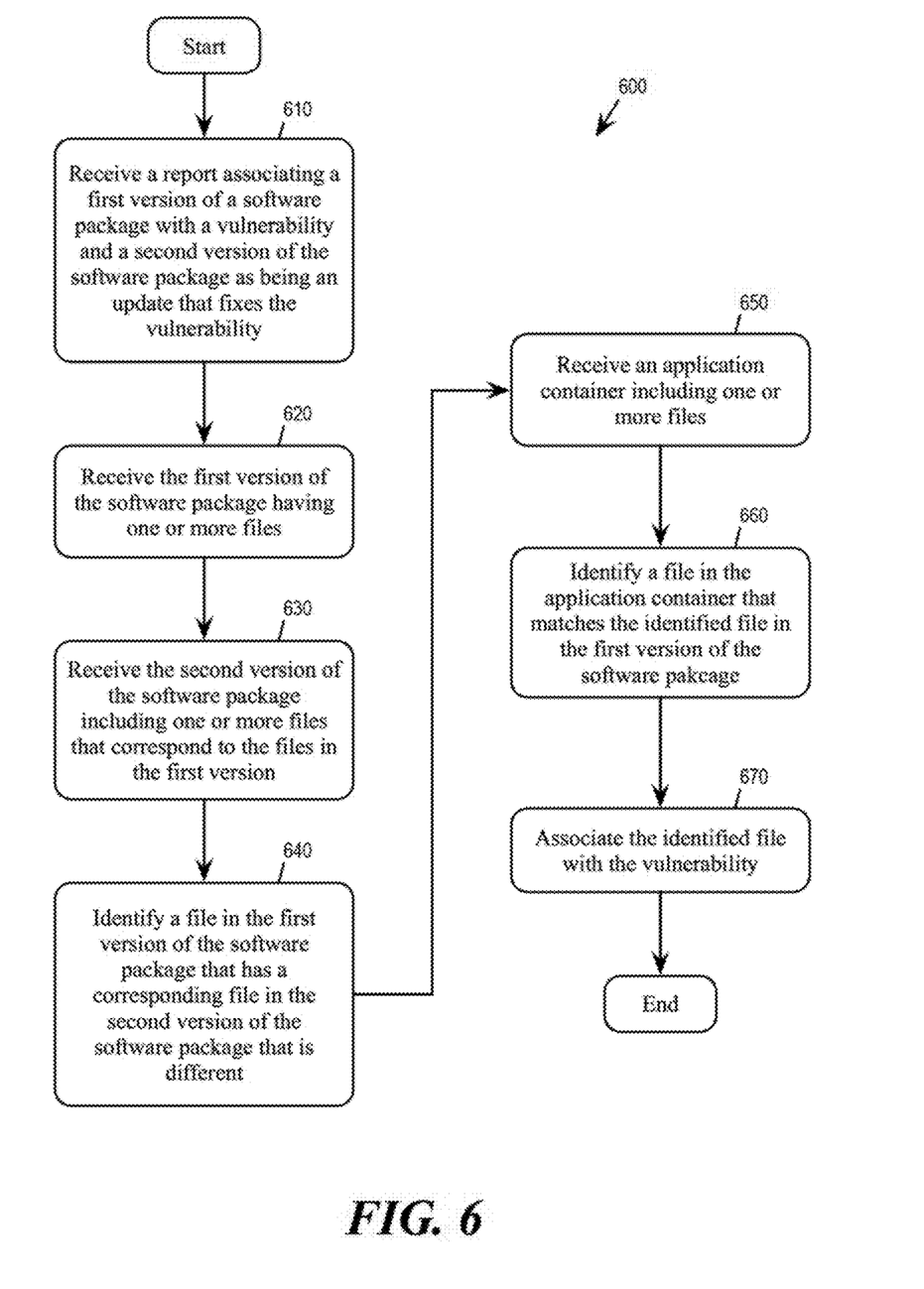
FIG. 6 conceptually illustrates a process for determining whether a container has files that may be sources of vulnerability, consistent with an exemplary embodiment.

FIG. 6 conceptually illustrates a process 600 for determining whether a container has files that may be sources of vulnerability, consistent with an exemplary embodiment. In some embodiments, one or more processing units (e.g., processor) of a computing device implementing the vulnerability detection system 100 perform the process 600 by executing instructions stored in a computer readable medium.

The system 100 starts the process 600 when it receives (at 610) a report associating a first version of a software package with a vulnerability and a second version of the software package as being an update that fixes the vulnerability. The report is a package-level vulnerability report that identify a version of the package as being vulnerable rather than specific files of the package as being vulnerable. In the example of FIG. 1, the vulnerability detection system 100 receives the package-level vulnerability report 102 from a vulnerability database 132, which can be a community vulnerability database such as CVE or NVD. The vulnerability detection system 100 also identifies the first and second versions (112 and 114) of the software package "PkgX" based on the content of the package-level vulnerability report 102.

The system 100 receives (at 620) the first version of the software package having one or more files. The system 100 receives (at 630) the second version of the software package, which has one or more files that correspond to the files in the first version.

The system 100 identifies (at 640) a file in the first version of the software package that has a corresponding file in the second version of the software package that is different. In other words, the system identifies a changed file that has changed from the first version to the second version, and therefore likely to be a source of the vulnerability that the second version is fixing. In some embodiments, the system reports the identified changed file in a file-level vulnerability report 104.

To identify the changed file, the system 100 compares the first version of the software package with the second version. In some embodiments, the system 100 extracts files from the first and second versions of the package respectively into a target system state and fixed system state and compares the two system states to identify any changed files. In some embodiments, the system 100 generates and compares file signatures of the first version with file signatures of the second version to identify any changed files.

The system 100 receives (at 650) an application container including one or more files or components. The application container may be a microcontainer that does not include a package manager to identify the package version of each container file. The system may also generate a signature or key for each container file.

The system 100 identifies (at 660) a container file in an application container that matches the changed file in the first version of the software package. The system 100 may compare the signatures (or keys) of the container files of the application container with the signatures of the changed files listed in the file-level vulnerability report. In the example of FIG. 5, the container "CtnY" has files whose signatures match the signatures of the changed files listed in the file-level vulnerability report 104 (for files "lib2.so" and "bin1" of version v10.3.5 of the package "PkgX").

The system 100 associates (at 670) the identified container file with the vulnerability. The system 100 generates a container vulnerability report for the application container to identify files in the container that may be sources of vulnerability. In the example of FIG. 5, the system 100 generates the container vulnerability report 106 which associates files of the container "CtnY" with vulnerabilities of v10.3.5 of the package "PkgX". If none of the file signatures of the application container match any of the file signatures of the file-level vulnerability report, the container vulnerability report may indicate that the application container has no vulnerability based on the package-level vulnerability report. The vulnerability detection system may display the container vulnerability report at a display device or store the container vulnerability report at a storage device for later use.

By comparing a vulnerable version of a software package with an updated version of the software package that fixes the vulnerability, the vulnerability detection system is able to generate a file-level vulnerability report and automatically determine the vulnerability of a microcontainer without using a package manager.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 6) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
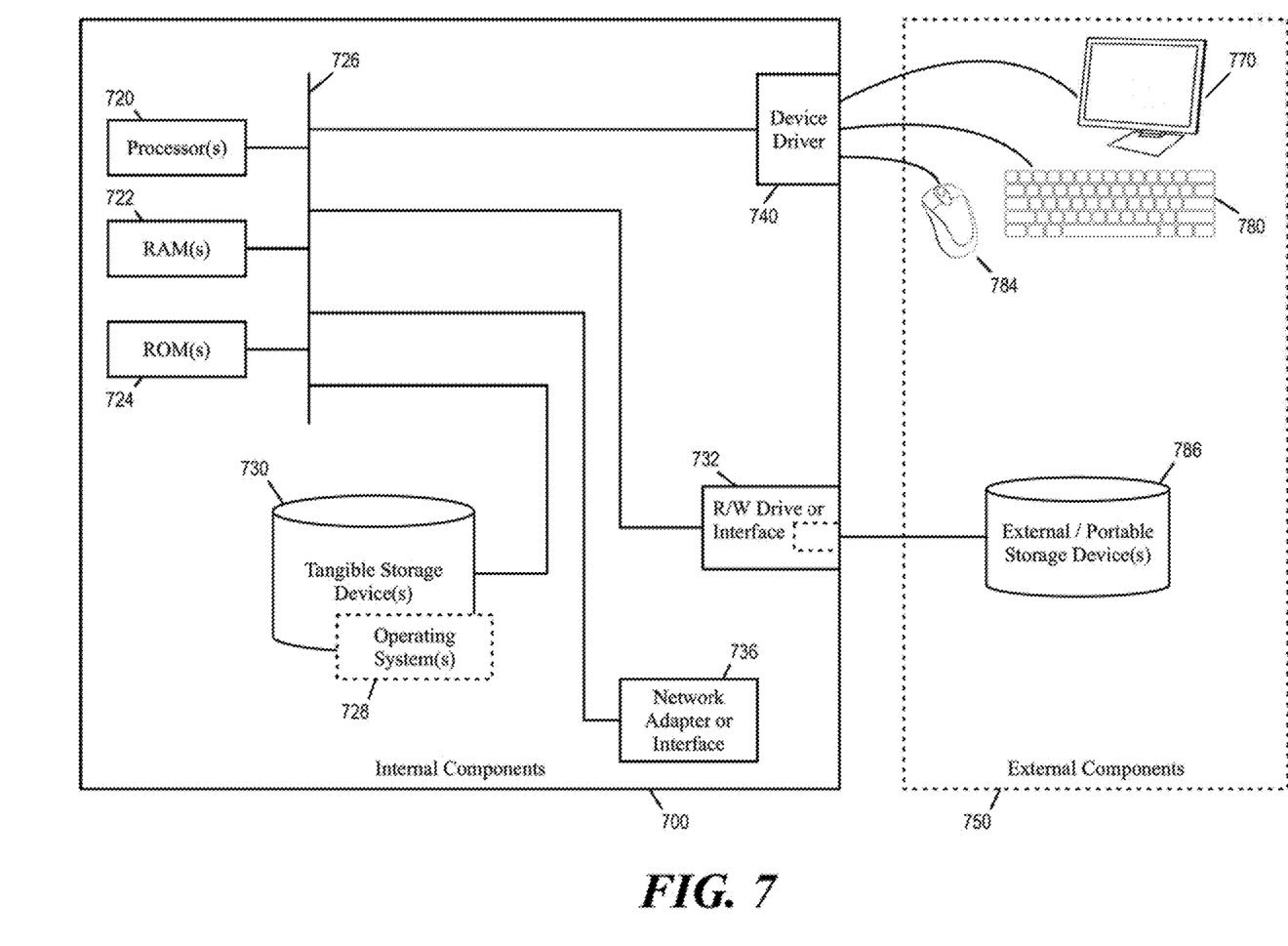
FIG. 7 shows a block diagram of the components of a data processing system in accordance with an illustrative embodiment of the present disclosure.

FIG. 7 shows a block diagram of the components of data processing systems 700 and 750 that may be used to implement the vulnerability detection system 100 in accordance with an illustrative embodiment of the present disclosure. It should be appreciated that FIG. 7 provides only an illustration of one implementation and does not imply any limitations with regard to the environments in which different embodiments may be implemented. Many modifications to the depicted environments may be made based on design and implementation requirements.

Data processing systems 700 and 750 are representative of any electronic device capable of executing machine-readable program instructions. Data processing systems 700 and 750 may be representative of a smart phone, a computer system, PDA, or other electronic devices. Examples of computing systems, environments, and/or configurations that may represented by data processing systems 700 and 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 700 and 750 may include a set of internal components 700 and a set of external components 750 illustrated in FIG. 7. The set of internal components 700 includes one or more processors 720, one or more computer-readable RAMs 722 and one or more computer-readable ROMs 724 on one or more buses 726, and one or more operating systems 728 and one or more computer-readable tangible storage devices 730. The one or more operating systems 728 and programs such as the programs for executing the process 600 are stored on one or more computer-readable tangible storage devices 730 for execution by one or more processors 720 via one or more RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

The set of internal components 700 also includes a R/W drive or interface 732 to read from and write to one or more portable computer-readable tangible storage devices 786 such as a CD-ROM, DVD, memory stick, magnetic tape, magnetic disk, optical disk or semiconductor storage device. The instructions for executing the process 600 can be stored on one or more of the respective portable computer-readable tangible storage devices 786, read via the respective R/W drive or interface 732 and loaded into the respective hard drive 730.

The set of internal components 700 may also include network adapters (or switch port cards) or interfaces 736 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 736. From the network adapters (or switch port adaptors) or interfaces 736, the instructions and data of the described programs or processes are loaded into the respective hard drive 730. The network may comprise copper wires, optical fibers, wireless transmission, routers, firewalls, switches, gateway computers and/or edge servers.

The set of external components 750 can include a computer display monitor 770, a keyboard 780, and a computer mouse 784. The set of external components 750 can also include touch screens, virtual keyboards, touch pads, pointing devices, and other human interface devices. The set of internal components 700 also includes device drivers 740 to interface to computer display monitor 770, keyboard 780 and computer mouse 784. The device drivers 740, R/W drive or interface 732 and network adapter or interface 736 comprise hardware and software (stored in storage device 730 and/or ROM 724).

The foregoing one or more embodiments implements a vulnerability detection system within a computer infrastructure by having one or more computing devices generating file-level vulnerability report based on package level vulnerability report. The computer infrastructure is further used to determine whether an application container include files that are sources of vulnerability according to the generated file-level vulnerability report.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
   a processor; and
   a storage device storing a set of instructions, wherein an execution of the set of instructions by the processor configures the computing device to perform acts comprising:
   receiving a package-level report associating a first version of a software package with a vulnerability and a second version of the software package as being an update that fixes the vulnerability;
   receiving the first version of the software package comprising one or more files;
   receiving the second version of the software package comprising one or more files that correspond to the files in the first version;
   identifying a changed file in the first version of the software package that is different from a corresponding file in the second version of the software package;
   identifying a container file in an application container that matches the changed file in the first version of the software package, wherein the application container is a microcontainer that does not include a package manager; and
   displaying a container vulnerability report that associates the identified container file with the vulnerability.

2. The computing device of claim 1, wherein the execution of the set of instructions further configures the computing device to perform acts comprising:
   generating a signature of the changed file in the first version of the software package; and
   generating a key for each of the one or more container files in the application container,
   wherein identifying a container file in the application container that matches the changed file from the first version of the software package comprises identifying a container file in the application container having a generated key that matches the signature of the changed file.

3. The computing device of claim 1, wherein identifying the changed file comprises comparing code files of the first and second versions of the software package but not data files or configuration files.

4. The computing device of claim 1, wherein the execution of the set of instructions further configures the computing device to perform acts comprising:
   generating a file-level vulnerability report that identifies one or more changed files and associates the changed files with the package-level report.

5. The computing device of claim 4, wherein the file-level vulnerability report includes a signature for each changed file.

6. The computing device of claim 5, wherein the signature of a changed file includes a size of the changed file and a hash value of the changed file.

7. A computer program product comprising:
   one or more non-transitory computer-readable storage devices and program instructions stored on at least one of the one or more non-transitory storage devices, the program instructions executable by a processor, the program instructions comprising sets of instructions for:
   receiving the first version of the software package comprising one or more files;
   receiving the second version of the software package comprising one or more files that correspond to the files in the first version;
   identifying a changed file in the first version of the software package that is different from a corresponding file in the second version of the software package;
   identifying a container file in an application container that matches the changed file in the first version of the software package, wherein the application container is a microcontainer that does not include a package manager; and
   displaying a container vulnerability report that associates the identified container file with the vulnerability.

8. The computer program product of claim 7, the program instructions further comprising sets of instructions for:
   generating a signature of the changed file in the first version of the software package; and
   generating a key for each of the one or more container files in the application container,
   wherein identifying a container file in the application container that matches the changed file from the first version of the software package comprises identifying a container file in the application container having a generated key that matches the signature of the changed file.

9. The computer program product of claim 7, wherein identifying the changed file comprises comparing code files of the first and second versions of the software package but not data files or configuration files.

10. The computer program product of claim 7, the program instructions further comprising sets of instructions for:
    generating a file-level vulnerability report that identifies one or more changed files and associates the changed files with a package-level report.

11. The computer program product of claim 10, wherein the file-level vulnerability report includes a signature for each changed file.

12. The computer program product of claim 11, wherein the signature of a changed file includes a size of the changed file and a hash value of the changed file.

13. A computer-implemented method comprising:
    receiving a package-level report associating a first version of a software package with a vulnerability and a second version of the software package as being an update that fixes the vulnerability;
    receiving the first version of the software package comprising one or more files;

receiving the second version of the software package comprising one or more files that correspond to the files in the first version;

identifying a changed file in the first version of the software package that is different from a corresponding file in the second version of the software package;

identifying a container file in an application container that matches the changed file in the first version of the software package, wherein the application container is a microcontainer that does not include a package manager; and displaying a container vulnerability report that associates the identified container file with the vulnerability at a display device.

14. The computer-implemented method of claim 13, further comprising:

generating a signature of the changed file in the first version of the software package; and generating a key for each of the one or more container files in the application container, wherein identifying a container file in the application container that matches the changed file from the first version of the software package comprises identifying a container file in the application container having a generated key that matches the signature of the changed file.

15. The computer-implemented method of claim 13, wherein identifying the changed file comprises comparing code files of the first and second versions of the software package but not data files or configuration files.

16. The computer-implemented method of claim 13, further comprising:

generating a file-level vulnerability report that identifies one or more changed files and associates the changed files with the package-level report.

17. The computer-implemented method of claim 16, wherein the file-level vulnerability report includes a signature for each changed file, the signature including a size of the changed file and a hash value of the changed file.

* * * * *